(12) United States Patent
Ehrig, Jr. et al.

(10) Patent No.: US 6,186,058 B1
(45) Date of Patent: Feb. 13, 2001

(54) ELECTRICALLY-OPERATED HAND FRUIT AND VEGETABLE PEELER

(76) Inventors: Jasper A. Ehrig, Jr., 5436 Bevis Ave., Van Nuys, CA (US) 91411; Warren L. Shaffer, 29006 Woodcreek Ct., Agoura Hills, CA (US) 91301

( * ) Notice: Under 35 U.S.C. 154(b), the term of this patent shall be extended for 0 days.

(21) Appl. No.: 09/322,761

(22) Filed: May 18, 1999

Related U.S. Application Data

(60) Provisional application No. 60/086,017, filed on May 18, 1998.

(51) Int. Cl.[7] ............................ A23N 7/00; A47J 17/18; B24B 7/20
(52) U.S. Cl. ............................................ 99/623; 451/178
(58) Field of Search .................... 99/584, 623, 627, 99/593; 451/178, 508, 541, 120, 177, 526, 532, 358; D7/372; D8/62, 90; D15/126, 124

(56) References Cited

U.S. PATENT DOCUMENTS

| D. 254,048 | * | 1/1980 | Hauenstein | D7/139 |
|---|---|---|---|---|
| 1,646,852 | * | 10/1927 | Carnowsky et al. | |
| 1,758,675 | * | 5/1930 | Reilly . | |
| 2,085,225 | * | 6/1937 | Lucks | 146/43 |
| 2,255,541 | * | 9/1941 | Dremel | 90/12 |
| 2,790,275 | * | 4/1957 | Castonguay | 51/166 |
| 3,026,612 | * | 3/1962 | Szczepanski | 30/123 |
| 3,156,276 | * | 11/1964 | Petrella et al. | 146/43 |
| 3,181,280 | * | 5/1965 | Bubelis | 51/170 |
| 4,073,056 | * | 2/1978 | Schaeffer et al. | 30/123.5 |
| 4,162,558 | * | 7/1979 | Rubio | 17/67 |
| 4,619,019 | * | 10/1986 | Hardy | 17/67 |
| 4,958,463 | * | 9/1990 | Hess et al. | 51/72 R |
| 5,369,916 | * | 12/1994 | Jefferies et al. | 451/532 |
| 5,564,969 | * | 10/1996 | Tsang | 451/358 |
| 5,780,088 | * | 7/1998 | Zittel et al. | 426/483 |
| 5,845,565 | * | 12/1998 | McNair-Chaplin | 99/593 |
| 5,941,764 | * | 8/1999 | Yang | 451/358 |

* cited by examiner

*Primary Examiner*—Keith Hendricks
*Assistant Examiner*—Drew Becker
(74) *Attorney, Agent, or Firm*—Christie, Parker & Hale, LLP

(57) ABSTRACT

An electrically-operated hand peeler having a peeler attachment removably coupled to the output shaft of an electrical motor is disclosed. The rotating drive of the electric motor causes the peeler attachment to rotate. The peeler attachment includes a rough exterior surface and abrades the outside surface of fruits and vegetables when the rough surface of the peeler attachment comes into contact with the outside surface of the fruits and vegetables. The peeler attachment can have varying degrees of surface roughness depending on the fruit or vegetable to be peeled. A shield is provided as a removable attachment to control and guide the peeled skin that is removed by the peeler. There may be additional accessories that could be used with the peeling device including a corer attachment and a blender attachment.

6 Claims, 6 Drawing Sheets

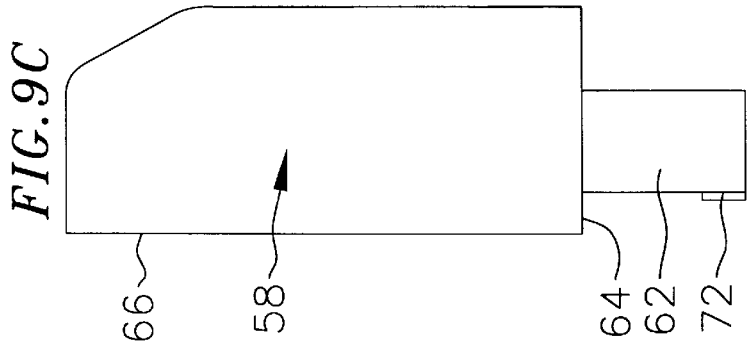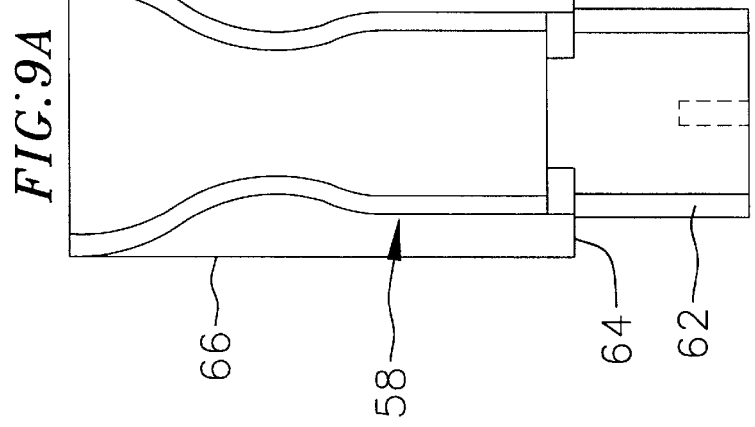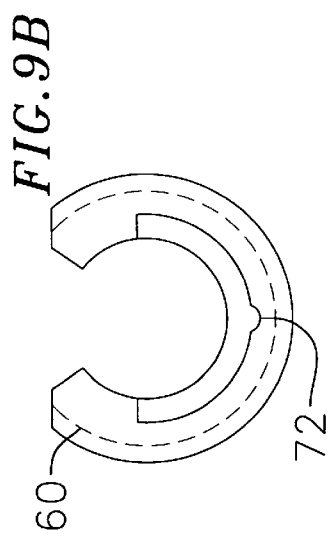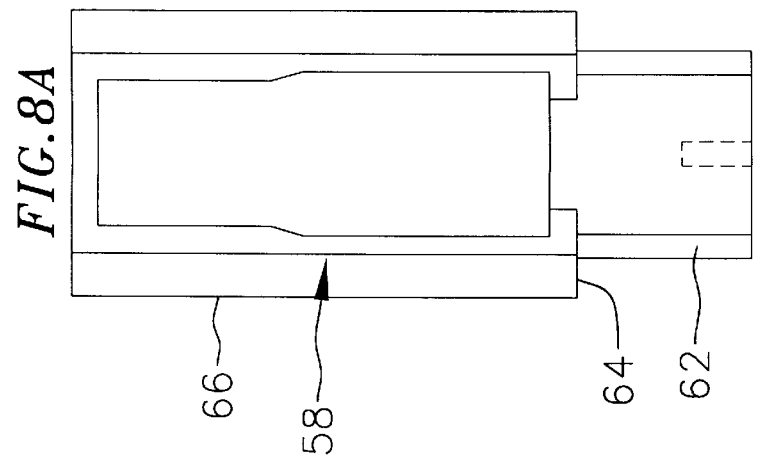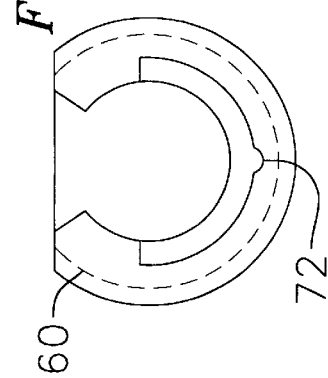

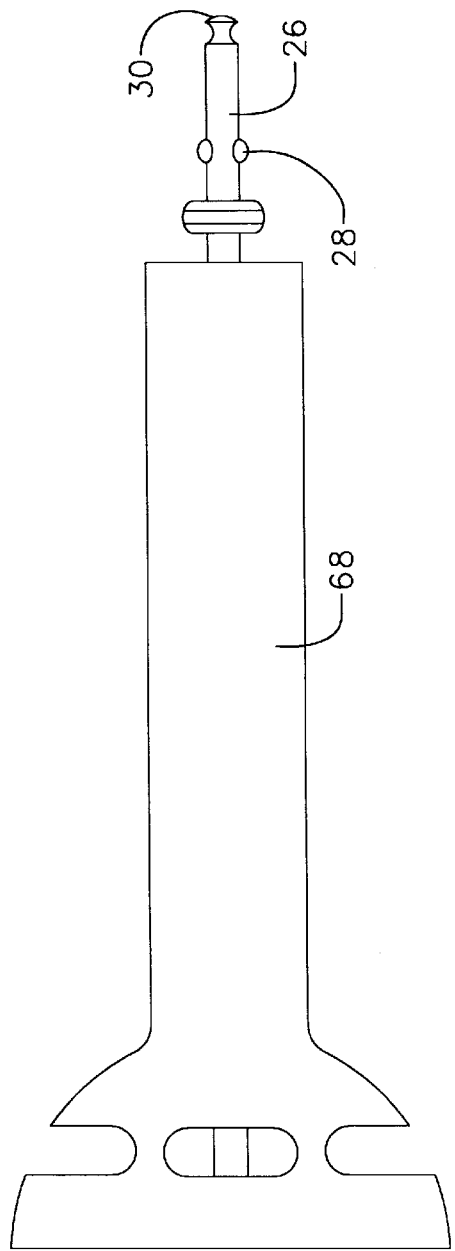
FIG. 10A
FIG. 10B
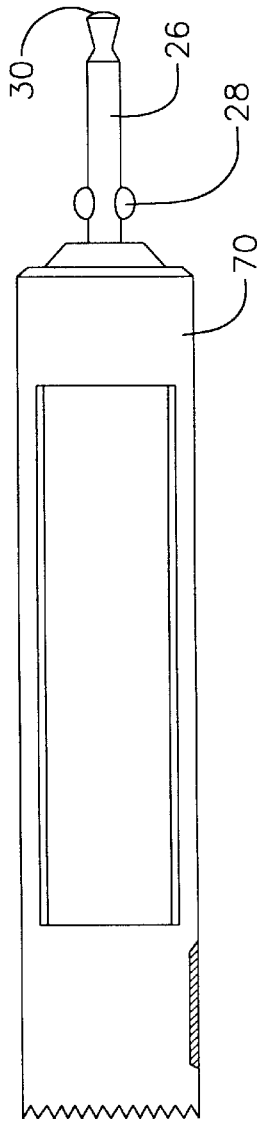
FIG. 11

ELECTRICALLY-OPERATED HAND FRUIT AND VEGETABLE PEELER

CROSS-REFERENCE TO RELATED APPLICATION

This application claims priority from U.S. Provisional application Ser. No. 60/086,017 filed May 18, 1998.

FIELD OF THE INVENTION

The present invention relates generally to hand held kitchen appliances, and more particularly, to an electrically operated hand fruit and vegetable peeler.

BACKGROUND OF THE INVENTION

Modern electrical appliances have made it more convenient to prepare foods in an efficient manner. It is not uncommon to find numerous electrical appliances in a kitchen, including blenders, mixers, food processors, bread makers, can openers and other devices. The list is probably too long to recite. The reason for the popularity of these appliances is that consumers are constantly seeking products that make their lives easier by helping them complete their tasks better and more efficiently. One aspect of cooking that consumes much time is peeling vegetables and fruits. Normally, this task is done manually by using a knife or a standard kitchen peeler. A known kitchen peeler has a metal or plastic handle attached to a long metal head. The metal head has an elongated opening therein. The sides of the opening are sharpened to create a blade. To peel vegetables and fruits, the peeler is lowered to contact the skin surface and is then moved to peel the skin away. There are numerous disadvantages to peeling vegetables in this manner. First, it is time consuming. The individual must painstakingly carve the skin off one row at a time. Depending on the fruit or vegetable, it could take several minutes to peel each item. If a large meal is being prepared, the peeling could take an excessive amount of time. Accordingly, it is desirable to have a device that can peel a variety vegetables and fruits in a time-efficient manner.

The second disadvantage of hand peeling is that it becomes tiresome to the hand and wrist. The person peeling the items must manually put sufficient pressure on the knife or peeler to separate the skin from the fruit or vegetable. The pressure applied must be continuous during the entire period of the peeling. Furthermore, the fingers must be wrapped tightly around the knife or peeler to ensure stable contact between the peeler and the item being peeled. The constant pressure combined with the fingers wrapped tightly around the knife or peeler strains the hand and wrist. A person who has weak or arthritic hands or wrists man be unable to manually peel vegetables or can do so only with discomfort. Accordingly, it is desirable to have a device that does not strain the hand and wrist during the peeling process.

Another disadvantage of using a knife or the known peeler is that the quality of the peeling is less than ideal. When using a manual peeling device, the quality of the peeling depends upon the peeling capabilities of the person performing the task. An experienced peeler will probably be able to peel a fruit or a vegetable leaving little or no skin and with minimal removal of the non-skin part of the vegetable or the fruit. A less experienced peeler, however, would not be as adept in using a knife or manual peeler. Therefore, the less experienced person would probably not be able to achieve a smooth, skinned surface. Rather, the surface would be choppy and chunks of skin can remain on the surface. This detracts from the taste and the aesthetic presentation of the food. Accordingly, it is desirable to have a device that would allow a less experienced person to peel vegetables and fruits leaving a smooth, skinned surface.

Yet another disadvantage of using a knife or the known peeler is that these tools can be unsafe around children. When peeling vegetables and fruits, parents must be aware of their children's access to the knife and their proximity to the peeling area. The sharp edges of the knife and the blade of the hand peeler can cause substantial harm. Additionally, it is possible to cut oneself during the peeling process. Accordingly, it is desirable to have a peeling device that is safer to use for the person using it and safer to have around children.

There have been a few attempts to develop improved fruit and vegetable peelers. One such prior art device is a battery operated peeler that basically combines a battery-powered base unit with features of the known peeler referred to above. The power unit causes the peeler to vibrate. In theory, the vibrating motion peels away the skin of the fruit and vegetable when it comes into contact with it. In reality, the device does not work well. First, the battery-operated power unit is not powerful enough to apply the pressure needed to peel the skin. Second, the vibratory motion does not cut away in a smooth manner. Rather, the vibrating peeler leaves a messy looking surface that has some skin left on it and is not aesthetically pleasing.

Another attempt at an improved device is a machine that has been marketed extensively on television. In this device, the fruit or vegetable is mounted on a stand. A spring-loaded arm having a small scoop at the end, contacts the fruit or vegetable mounted on the stand. The scoop at the end of the spring-loaded arm has a sharp circumference. A hand crank is rotated causing the fruit or vegetable to rotate on the stand. As the fruit or vegetable rotates, the small scoop, takes off the top layer. The problem with this device is two-fold. First, it is bulky. Considering the number of appliances in the modern kitchen today, the consumers have a limited amount of cabinet or counter space available for new products. It is desirable to have a small device that does not take up an excessive amount of room in the kitchen. The second problem with this device is that it scoops out more than just the skin layer. When the peeling is completed, grooves can be observed in the fruit or vegetable. This may not be aesthetically desirable in the food presentation. Also, some of the fruit and vegetable is wasted as it is scooped out along with the skin. Accordingly, it is desirable to have a device that does not leave unsightly grooves in the fruits and vegetables and only peels away the skin.

SUMMARY OF THE INVENTION

The present invention addresses the needs and deficiencies noted above. It provides a small electrically-powered kitchen appliance or tool which is sufficiently small in size that it can be held easily in one hand in any way which is convenient, comfortable and effective for the user. It preferably does not rely on the use of electric storage batteries, and so can be made both compact and adequately powerful. Its proper and effective use is not dependent upon a high, or even moderate, level of user experience. It operates to effectively remove the skin of a vegetable or a fruit without appreciable removal of the meat or non-skin portion of the vegetable or fruit.

Generally speaking in structural terms, the present invention is a kitchen tool for abrasively peeling vegetables and the like having a rotary electric motor, a housing enclosing the motor, a manually operable switch, and a peeler element detachably connected to the motor. The motor has a rotatable output shaft that is accessible from the exterior of the housing. The peeler element is detachably connected coaxially to the shaft for rotation by the shaft. The head portion of the peeler element has an exterior surface with a non-smooth surface having a selected roughness. The exterior surface is in coaxial alignment with the shaft and defines the surface of revolution. The switch is carried by the housing and is connected to the motor to control the operation of the motor.

DESCRIPTION OF THE DRAWINGS

The above-mentioned and other features and advantages of the structural and procedural aspects of the present invention are set forth in and made apparent by the following Detailed Description of the Invention when considered in connection with the accompanying drawings, wherein:

FIGS. 8A and 8B are the bottom and end views of a plastic shield of the present invention;

FIGS. 9A, 9B and 9C are bottom, end and side views of another shield which is particularly useful with the tapered peeler attachment shown in FIG. 6A, e.g.;

FIGS. 10A and 10B are end and side views of a blender accessory for the present invention; and FIG. 11 is a side view of a corer accessory for of the present invention.

DETAILED DESCRIPTION OF THE INVENTION

Figure 1A:
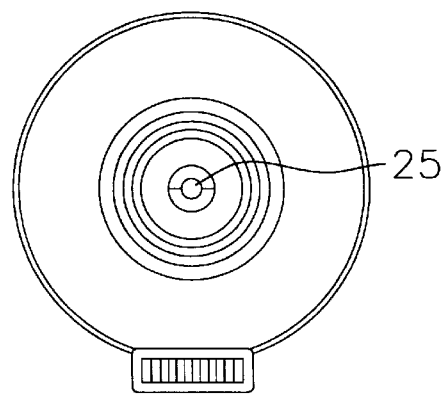
FIGS. 1A and 1B are end and side views of the power unit of an electrically operated hand fruit and vegetable peeler according to the present invention.
Figure 2A:
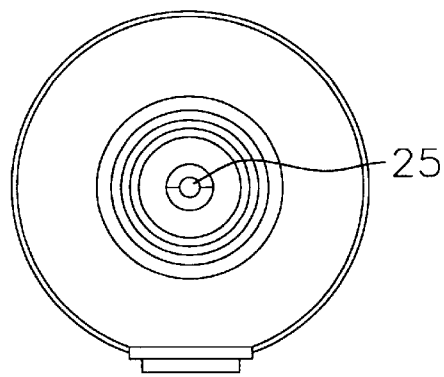
FIGS. 2A and 2B are end and side views of a second embodiment of the power unit of the electrically operated hand fruit and vegetable peeler according to the present invention.
Figure 1B:
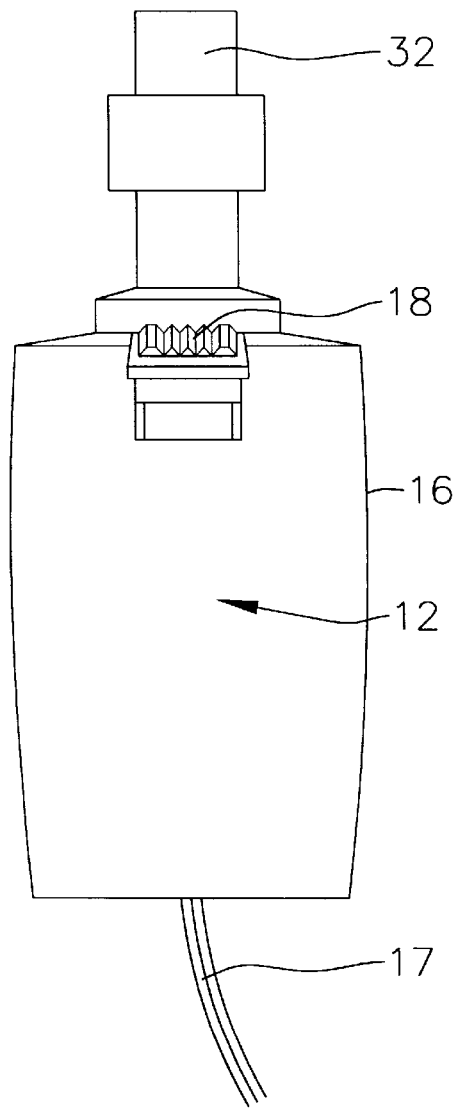
Figure 2B:
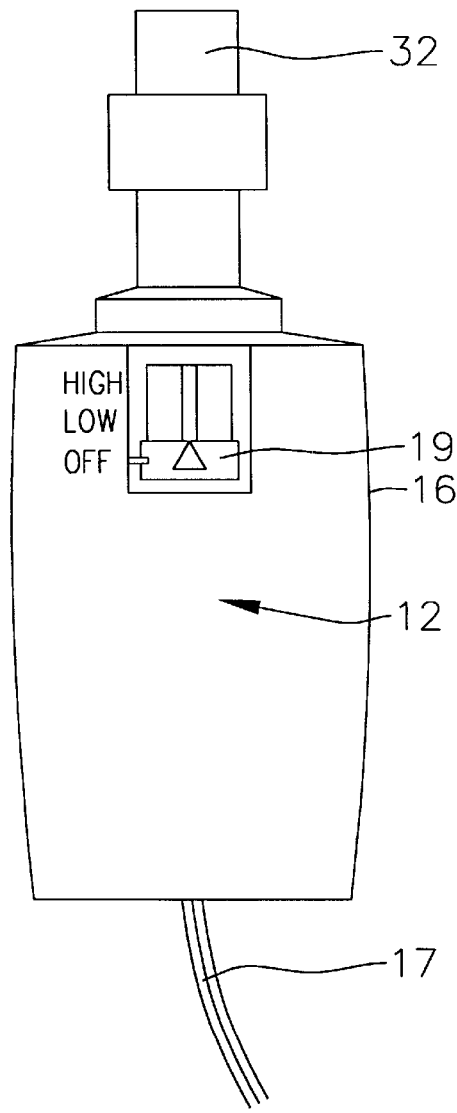
Figure 4A:
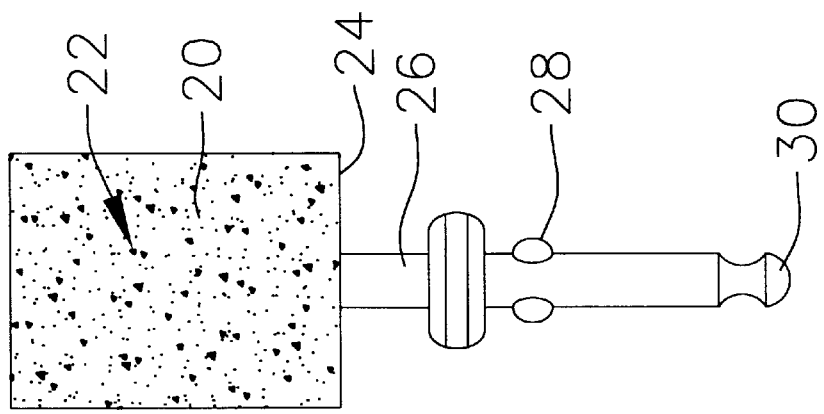
FIGS. 4A, 4B and 4C are side views of different ones of a series of the peeler attachment shown in FIG. 3 having coarse, medium and fine working surface textures.
Figure 4B:
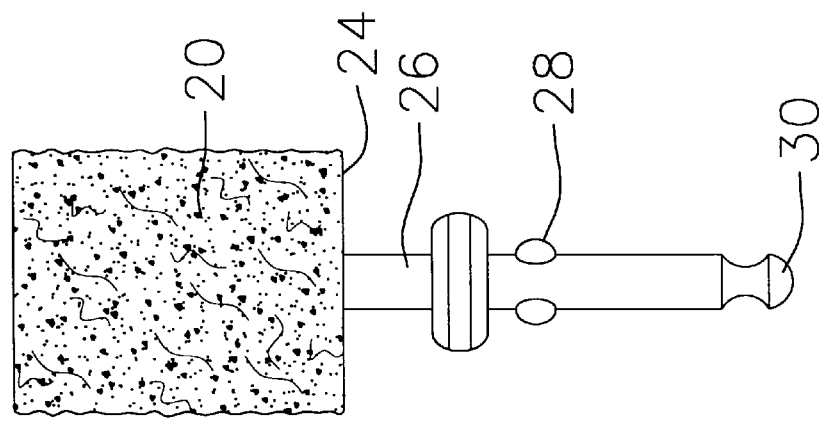
Figure 4C:
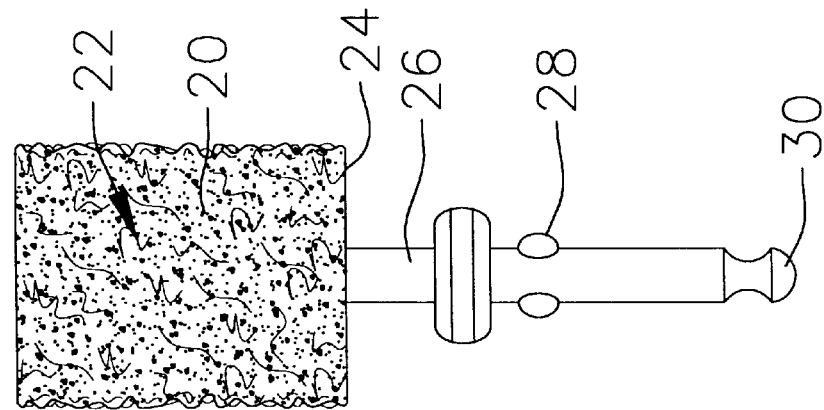
Figure 7:
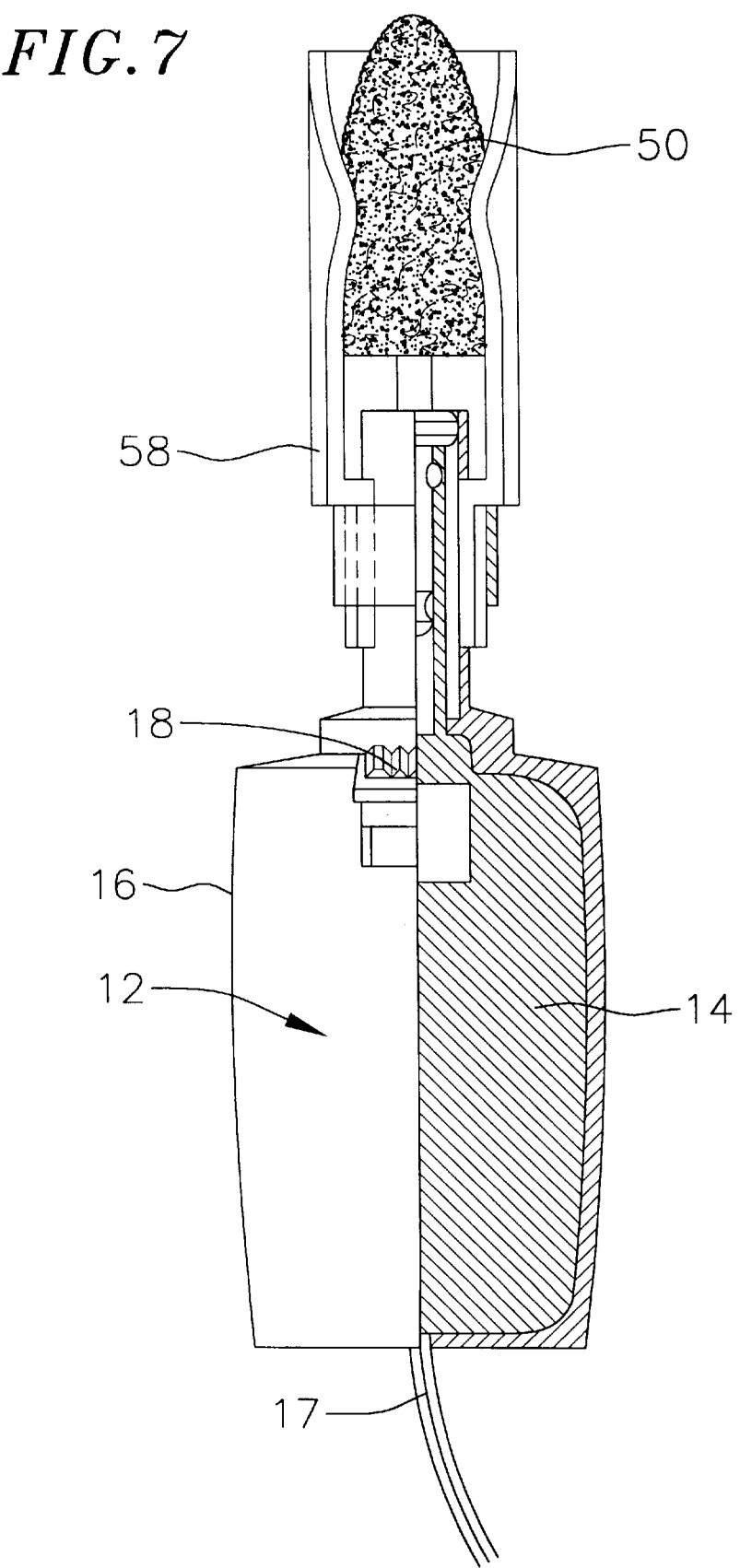
FIG. 7 is a side view of the electrically-operated hand fruit and vegetable peeler of the peeler attachment shown in FIG. 5.

The power unit of an electrically operated hand fruit and vegetable peeler 10 according to the present invention is shown in FIGS. 1A and 1B and also in FIG. 7. The power unit 12 includes an electric motor 14 and a housing 16 accommodating the electric motor. An on/off switch 18 projects from the housing and is operatively coupled to the motor to allow a user to selectively operate the motor. The switch is preferably designed as an automatic on/off switch, such that, for safety reasons, the peeler automatically stops when the user releases the switch. Alternatively, as shown in FIGS. 2A and 2B, the switch may be a variable speed switch 19, such that a user can selectively vary the speed at which the motor rotates. A multiple conductor electrical cable 17 extends from the housing to a terminal plug of suitable type which is engageable in a correspondingly defined electrical power outlet.

Figure 3:
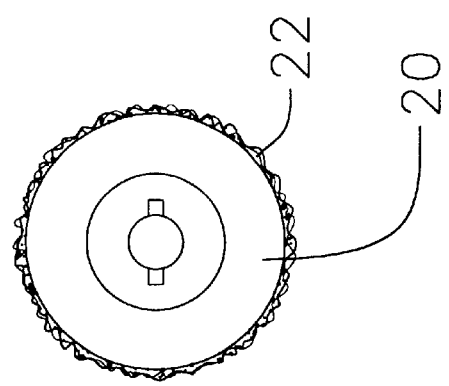
FIG. 3 is a bottom end view of a peeler attachment of the present invention.

FIGS. 3 through 6 show different ones of a set of peeler attachments of the present invention. FIG. 3 shows a bottom end view of one embodiment of one style of the peeler attachment 20. The head portion 21 of the peeler attachment 20 has a generally right circularly cylindrical exterior surface 22 that has an uneven texture of selected roughness. The exterior surface 22 defines the surface of revolution of the peeler attachment 20. As the peeler attachment rotates, the uneven texture interacts with the outside surface of a fruit and vegetable and peels it by abrading. FIGS. 4A, 4B and 4C show the cylindrical peeler attachment having coarse, medium and fine texture roughness textures, respectively, in the exterior working surface of the different attachments.

Extending from the bottom surface 24 of the peeler attachment 20 is an attachment shaft 26. The attachment shaft 26 is designed to be removably coupled with the output shaft 32 of the electric motor 16. The coupling of the attachment shaft 26 to the electric motor shaft 32 can be accomplished by various known means. In the preferred embodiment, the shaft 26 includes radial wings or lugs 28 that interact with spline grooves 25 in the end of a hollow motor shaft in the power unit to secure the engaged shafts from rotation relative to each other. Additionally, a ball detent (not shown) can be provided in the hollow motor shaft to engage in a circumferential groove 30 at the bottom of the attachment shaft 26 to hold the peeler attachment firmly in place in the motor shaft 32 so that the two shafts do not move axially relative to each other.

The rotating drive of the motor 16 causes the peeler attachment 20 to rotate. When the rough surface of the peeler attachment comes into contact with an item of fruit or vegetable with a force controlled by the user, the skin of the item is abraded and the item is peeled. The peeler 10 can be used to peel a variety of fruits and vegetables including potatoes, carrots, cucumbers, apples or the like.

Figure 6A:
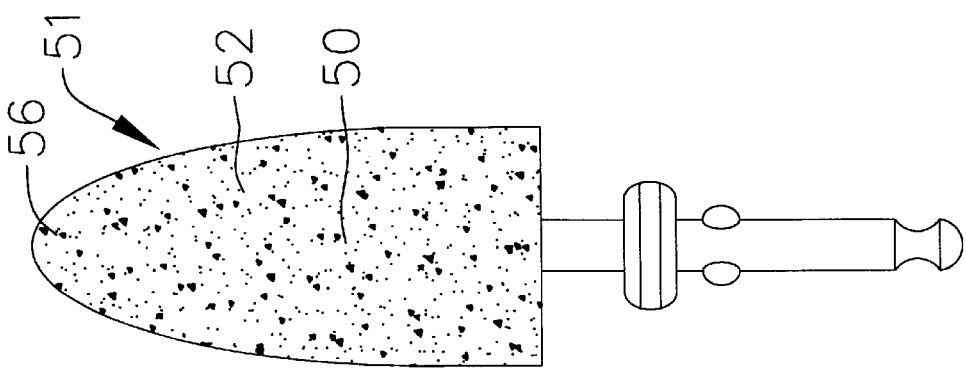
FIGS. 6A, 6B and 6C are side views of different ones of a series of peeler attachment of -the present invention having a tapered form.
Figure 6B:
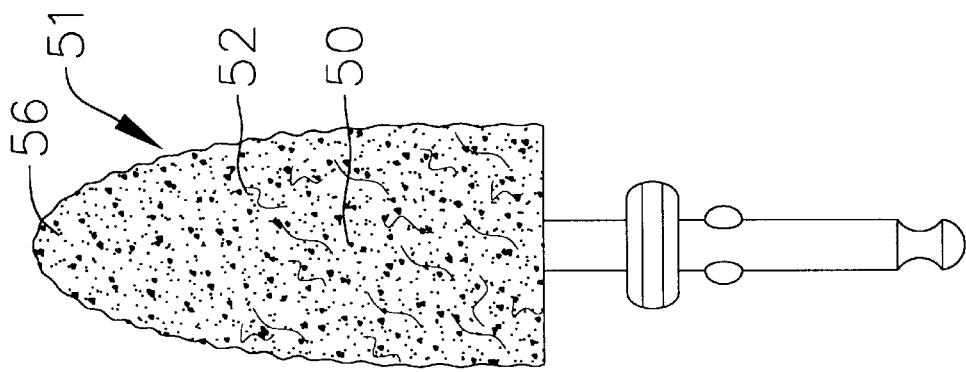
Figure 6C:
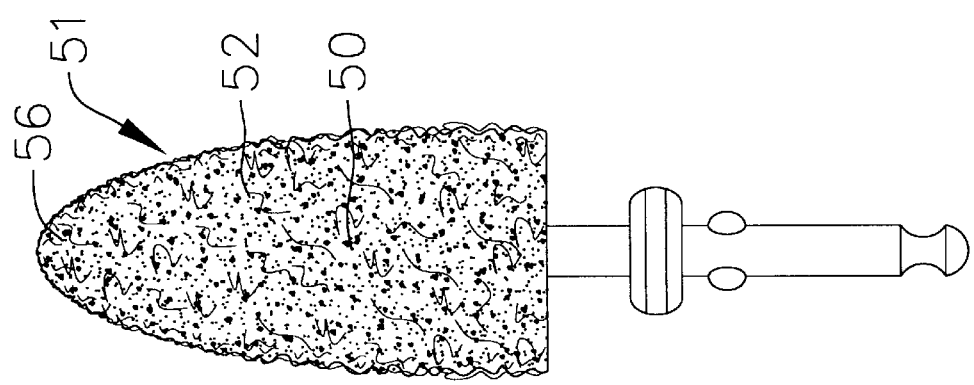
Figure 5:
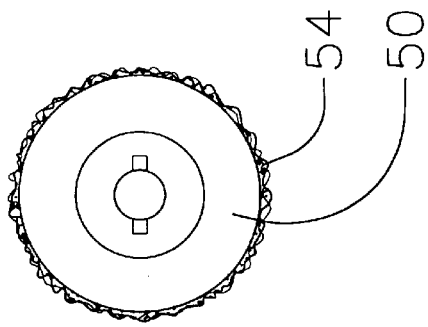
FIG. 5 is a bottom end view of a second embodiment of the peeler attachment of the present invention.

FIGS. 6A, 6B and 6C show different ones of a second style of the peeler attachment of the present invention. In this style, the peeler attachment 50 has a head portion 51 with a parabolic shape 54. The parabolic shape 54 of the head portion 51 has a tapered surface 52 which converges to a tip 56. The tip 56 is useful in peeling vegetable that have an uneven surface. One such vegetable is the potato. The uneven surface of the potato makes it difficult to peel Additionally, the eyes of the potato are often embedded in the potato flesh. The tapered surface 52 and tip 56 can be used to maneuver around the uneven surface of the potato. Moreover, the tip 56 can be used to remove the eyes of the potato.

The peeler attachment 50 is preferably formed using a bullet-shaped wooden form and gluing sand particles of selected size thereon until the desired texture is obtained. The wooden form, as so covered with sand, is then used to make a mold for the peeler attachment 50. In a presently preferred embodiment, a polyurethane resin is used to form the peeler attachment. The attachment shaft is cast directly in the head portion of the peeler attachment. Those skilled in the art should realize that other suitable materials may alternatively be utilized. Additionally, those skilled in the art should realize that different grades of sand, or other suitably abrasive materials, may be utilized with the present invention to provide peeler attachments with varying degrees of exterior surface roughness. For example, applicants have empirically determined that a peeler attachment made using very fine sand is well suited for peeling carrots, while a peeler attachment made using coarse sand is better suited for peeling potatoes. Therefore, it may be desirable to provide a plurality of peeler attachments with the electrically operated hand peeler 10, each of the plurality of peeler attachments specifically designed for certain types of fruits and/or vegetables as a result of its unique surface roughness (e.g. coarse, medium, fine).

In one embodiment, the peeler attachment is about one and a half inches in length, and about one-half inch in diameter, however, those skilled in the art should realize that other size peeler attachments may alternatively be utilized.

The housing is preferably a closed unit around the motor and other internal components of the peeler, and is formed from a plastic shell. Additionally, the housing is preferably very light in weight, and about eight inches long, so that it comfortably fits into the hand of a user.

As shown in FIGS. 8A and 8B, a shield 58 may be provided as a removable attachment to control and guide the peeled skin that is removed from a fruit or vegetable by the present invention. The shield is preferably removably coupled to the housing 16 by any means well known in the art and may be removed as necessary for cleaning or the like.

In an exemplary embodiment, the cover has a semicircular cross section 60 and partially surrounds the peeler attachment. A sleeve 62 is integrally attached at the base 64 of shield 58. The power unit 12 defines a recess for receiving the sleeve 62 of the shield 58. Once the sleeve is inserted in the recess and the peeler attachment is installed in the power unit, the shield 58 is locked into place. In the preferred embodiment, the sleeve and the recess lock using an I-formation. The sleeve 62 has a raised notch 72. The recess of the power unit contains a first and second channel for dimensioned to receive the raised notch 72. The raised notch 72 of the sleeve 62 is slid into the first channel. The sleeve is then rotated and slid into a second channel. This I-lock ensures that the sleeve is secured in place.

FIGS. 9A, 9B and 9C show an alternative embodiment of the shield for use with the tapered peeler attachment. In this embodiment, the top portion 66 of shield 58 has a wide cut-out to expose the tip 56 of the tapered peeler attachment 50.

FIG. 7 is an exemplary embodiment of the present invention showing the power unit 12, the tapered peeler attachment 50 and the shield 58 mutually installed. The shield 58 guides and controls the skin that is removed from the fruits and vegetables and protects the user from the debris. There is sufficient space allowed, however, for the peeler attachment to interact with the outside surface of the fruits and vegetables.

A prototype of the present invention utilizes a 160W motor to provide the necessary power to drive the peeler attachment. However, those skilled in the art should realize that other motors can alternatively be used, and the selection of a particular motor will depend upon a variety of factors, including the available space within the housing, the surface roughness of the peeler attachment, and the types of attachments with which the present invention will be used.

It should be noted that the peeler attachment may be used with the electrically operated hand peeler 10 provided by the present invention, or alternatively may be provided as a separate attachment for existing hand-held kitchen appliances, such as the BRAUN Handblender MR310, or other appliances that provide the necessary rotation for the peeler attachment. Those skilled in the art should realize that it may be necessary to provide a suitable adapter to allow the peeler attachment to be coupled to existing hand-held kitchen appliances.

It should also be noted that additional attachments, such as a blender attachment (FIGS. 10A and 10B) or a coring attachment (FIG. 11), may be provided with the electrically operated hand peeler according to the present invention. The additional attachments are preferably designed to be directly coupled to the output shaft of the electrical motor. When another function is desired by the user of the present invention, the peeler attachment could be removed, and replaced with one of the additional attachments described above. Those skilled in the art should realize that further well-known attachments, other than those described above, may also be provided and utilized with the present invention.

The present invention provides numerous benefits and advantages. The electrically-operated hand peeler provides an efficient and effective kitchen tool that is comfortable to use. The plastic head portion of the peeler element is rust proof and easy to clean in water during use. Since the device does not rely on the use of electric storage batteries, it can be made both compact and adequately powerful.

While various embodiments of this invention have been shown and described, it would be apparent to those skilled in the art that many modifications are possible without departing from the inventive concept disclosed herein. It is therefore to be understood that this invention may be practiced otherwise than as specifically described.

What is claimed is:

1. An electrically powered kitchen tool for abrasively peeling vegetables and fruits and comprising:
   a rotary electric motor having a rotatable output shaft;
   a housing enclosing the motor and sized and configured for one hand holding with the shaft being accessible from an end of the housing;
   a manually operable switch carried by the housing and connected to the motor, the switch being operable to control operation of the motor;
   a rotatable peeler element detachably connected coaxially to the shaft for rotation by the shaft, the peeler element having a head portion the exterior surface part of which consists of a synthetic resin, the exterior surface being a surface of revolution in coaxial alignment with the shaft and a non-smooth surface having a selected roughness.

2. The apparatus of claim 1 in which the surface of revolution is cylindrical.

3. The apparatus of claim 1 in which the surface of revolution is substantially parabolic.

4. The apparatus of claim 1 in which the peeler element is one of a set of peeler elements each of which is detachably connectable to the motor shafts, the head portion exterior surfaces of the elements of the set each differing from others in the set in at least one of the following ways: roughness, and kind of surface revolution.

5. The apparatus of claim 1 in which the texture of the peeler element exterior surface is defined as a simulation of sandpaper.

6. An electrically powered kitchen tool according to claim 14 including
   a hollow shield disposed substantially coaxially of and partially enclosing the peeler element, the shield being open along one side thereof for lateral access to the peeler element and being open at its end opposite from the motor housing and beyond which a portion of the peeler element extends.

\* \* \* \* \*

UNITED STATES PATENT AND TRADEMARK OFFICE
CERTIFICATE OF CORRECTION

PATENT NO. : 6,186,058 B1
DATED : February 13, 2001
INVENTOR(S) : Jasper A. Ehrig, Jr. and Warren L. Shaffer It is certified that error appears in the above-identified patent and that said Letters Patent is hereby corrected as shown below:

<u>Column 6,</u>
Lines 57-58, replace "claim 14" with -- claim 1 --.

Signed and Sealed this

Sixteenth Day of July, 2002

*Attest:*

*Attesting Officer*

JAMES E. ROGAN
*Director of the United States Patent and Trademark Office*